(12) United States Patent
Bhattacharyya

(10) Patent No.: US 7,081,287 B2
(45) Date of Patent: *Jul. 25, 2006

(54) HIGH PERFORMANCE THERMOPLASTIC VULCANIZATE

(75) Inventor: Jayanta Bhattacharyya, Ocala, FL (US)

(73) Assignee: Dayco Products, LLC, Miamisburg, OH (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/262,813

(22) Filed: Oct. 2, 2002

(65) Prior Publication Data

US 2003/0039784 A1 Feb. 27, 2003

Related U.S. Application Data

(62) Division of application No. 09/311,310, filed on May 13, 1999, now Pat. No. 6,524,673.

(51) Int. Cl.
*C09K 103/00* (2006.01)

(52) U.S. Cl. ............... 428/36.9; 252/182.13; 528/63; 528/66; 528/125; 528/127; 528/129; 528/424; 528/440; 528/453; 528/528

(58) Field of Classification Search ......... 428/36.9; 525/66, 125, 127, 129, 424, 440, 453, 528, 525/63; 138/177; 252/182.13, 182.2, 182.23

See application file for complete search history.

(56) References Cited

U.S. PATENT DOCUMENTS

| | | | | |
|---|---|---|---|---|
| 3,243,475 A * | 3/1966 | Reischl et al. | ................. | 528/26 |
| 3,594,449 A * | 7/1971 | Binder | ...................... | 525/128 |
| 3,972,757 A * | 8/1976 | Derderian et al. | .......... | 156/143 |
| 4,035,440 A * | 7/1977 | Khanna et al. | .............. | 525/131 |
| 4,098,739 A * | 7/1978 | Westermann | ................ | 524/379 |
| 4,207,404 A * | 6/1980 | Coran et al. | ................. | 525/184 |
| 4,273,160 A * | 6/1981 | Lowles | ........................ | 138/124 |
| 4,460,748 A * | 7/1984 | Rauer | ......................... | 525/256 |
| 4,537,736 A * | 8/1985 | Peltzman et al. | ........... | 264/130 |
| 4,624,989 A * | 11/1986 | Berta | .......................... | 525/187 |
| 4,629,761 A * | 12/1986 | Wolfe, Jr. | ................. | 525/92 A |
| 4,727,114 A * | 2/1988 | Chen | ........................... | 525/239 |
| 5,051,474 A * | 9/1991 | Warren et al. | .............. | 525/131 |
| 5,387,648 A * | 2/1995 | Ainsworth | .................... | 525/192 |
| 5,451,624 A * | 9/1995 | Memon et al. | ............. | 524/151 |
| 5,457,146 A * | 10/1995 | Ogoe et al. | ................. | 524/409 |
| 5,476,121 A * | 12/1995 | Yoshikawa et al. | ......... | 138/138 |
| 5,523,357 A * | 6/1996 | Peterson | ..................... | 525/240 |
| 5,683,773 A * | 11/1997 | Kemper | ................... | 428/36.91 |
| 6,300,407 B1 * | 10/2001 | Machleder et al. | ......... | 524/515 |
| 6,623,822 B1 * | 9/2003 | Bhattacharyya | ............ | 428/36.9 |
| 6,949,277 B1 * | 9/2005 | Bhattacharyya | ............ | 428/36.9 |

* cited by examiner

*Primary Examiner*—Harold Pyon
*Assistant Examiner*—Sow-Fun Hon
(74) *Attorney, Agent, or Firm*—Joseph V. Tassone; J. Daniel Lykins

(57) ABSTRACT

A high performance thermoplastic hose useful as a power steering hose, the high performance thermoplastic hose comprising a high performance engineering thermoplastic such as polyurethane and a chlorine-containing polyolefin such as chlorinated polyethylene, chlorinated polypropylene, chlorinated copolymers containing ethylene and propylene, chlorosulfonated polyethylene, chlorosulfonated polypropylene, chlorosulfonated copolymers of ethylene and propylene or mixture thereof, is disclosed. Also disclosed are a method for manufacturing the high performance thermoplastic hose, and a thermoplastic vulcanizate capable of resisting chemical attack and withstanding temperatures up to about 300° F.

14 Claims, No Drawings

HIGH PERFORMANCE THERMOPLASTIC VULCANIZATE

CROSS REFERENCE TO RELATED APPLICATIONS

This application is a divisional of U.S. Ser. No. 09/311,310, filed May 13, 1999, now U.S. Pat. No. 6,524,673.

BACKGROUND OF THE INVENTION

1. Field of the Invention

The present invention relates to a thermoplastic vulcanizate prepared from a high performance engineering thermoplastic polymer such as polyurethane and a chlorosulfonated polyolefin and/or a chlorinated polyolefin; to a high performance hose such as a power steering hose constructed from such thermoplastic vulcanizate material; and to a method for the manufacture of such high performance hoses.

2. Description of the Prior Art

Hoses, particularly curved hoses, typically, are manufactured by positioning a pre-cut length of uncured hose over a curved mandrel and then heating the mandrel and curing the hose so that the hose retains its desired shape. The hose may solely be an elastomeric tube or it may be surrounded or have incorporated therein a twined reinforcement. Optionally, a cover may surround the hose. Typically, the hose is made by extruding a tube of heat curable elastomer. The hose is then placed over the mandrel which is heated to cure the inner layer next to the mandrel. The cured hose is then removed from the mandrel while the mandrel is hot to facilitate easy removal of the cured hose from the mandrel. One such method is described in U.S. Pat. No. 4,537,736 to Peltzman et al. Such rubber hoses have been used in a wide variety of applications such as fuel feed hoses, torque converter hoses, air conditioner hoses, power steering hoses, etc. However, in general, rubber surfaces do not exhibit high resistance to chemical attack and prior art attempts have failed to increase the chemical resistance beyond certain limits. For example, U.S. Pat. No. 5,476,121 to Yoshikawa et al discloses rubber hoses having improved barrier and flexibility performance by providing an inner tube of a synthetic resin having an outer peripheral surface, forming a thin film of silver or a silver base alloy on the outer surface of the inner tube, and heat curing a rubber layer to the thin film through an adhesive layer.

High performance hoses such as power steering hoses require high resistance to both chemical and temperature degradation. At present, power steering hoses and other high performance hoses are made from compounded elastomers such as a chlorinated polyethylene, a chlorosulfonated polyethylene or similar materials capable of withstanding temperatures up to 300° F. and the chemical effects of power steering fluids. Chlorine-containing polyolefins including chlorinated polyethylene and chlorosulfonated polyethylene generally possess good mechanical properties, good compression set, good low temperature flexibility and good dynamic fatigue resistance. These materials also exhibit excellent aging, weathering, chemical and ozone resistance due to their saturated backbones. However, in order to withstand high temperatures of about 300° F. and chemical resistance to power steering fluids, hoses constructed of such materials must be built and vulcanized on a mandrel and then removed from the mandrel for additional processing. A method for the manufacture of power steering hose on a mandrel is further described in U.S. Pat. No. 3,972,757 to Derderian et al. In view of the cost associated with manufacturing high performance hoses such as power steering hoses, it is desirable to provide materials having the desired characteristics but which are easily formable without the use of a mandrel while providing improved performance and reduced overall costs.

U.S. Pat. No. 5,683,773 to Kemper teaches an automotive hose where the inner tube or, preferably, the cover portion is formed of an elastomer comprising a chlorinated polyethylene-based elastomer or polyether-based elastomer stabilized with barium sulfate.

SUMMARY OF THE INVENTION

In accordance with the present invention, high performance hoses such as power steering hoses are prepared from a thermoplastic vulcanizate (TPV) using a chlorinated polyolefin and/or a chlorosulfonated polyolefin with polyurethane or one or more similar high performance engineering thermoplastic materials. There is no known thermoplastic material, when used alone, which will withstand the temperature and the fluid of power steering applications for prolonged periods of time. However, it has been found that such thermoplastic materials typically have high green strength, high tear strength and good abrasion resistance and when used with the chlorinated polyolefins and/or chlorosulfonated polyolefins in accordance with the present invention, can be employed in the manufacture of high performance hose such as power steering hose. The high performance engineering thermoplastic material can be crosslinked in the matrix during extrusion of the thermoplastic vulcanizate by adding any suitable crosslinking agent to the vulcanizate. Chlorosulfonated polyethylene or a mixture of chlorinated polyethylene and chlorosulfonated polyethylene compounded with polyurethane has been found to be particularly useful in the preparation of the thermoplastic vulcanizate of the present invention. The thermoplastic vulcanizate of the present invention exhibits the following advantages over the prior art:

(1) Vulcanization is not required;
(2) The material can be extruded to close tolerance without a mandrel;
(3) The material is light weight due to high modulus, and less material is needed;
(4) The material is recyclable;
(5) The material is easily formed into hoses;
(6) The material has better abrasion and tear resistance than prior art materials; and
(7) The material can be made at a lower overall cost with better performance than prior art materials.

It is one aspect of the present invention to provide a light weight thermoplastic vulcanizate material having improved abrasion and tear resistant characteristics for use in the manufacture of high performance hoses such as power steering hoses.

It is another aspect of the invention to provide a high performance hose such as a power steering hose constructed from such thermoplastic vulcanizate material.

It is yet another aspect of the invention to provide a method for manufacturing the high performance hose which eliminates the processing steps required for prior art elastomeric hose.

DETAILED DESCRIPTION OF THE INVENTION

The thermoplastic vulcanizate material of the present invention comprises a chlorinated polyolefin and/or a chlorosulfonated polyolefin and a high performance engineering thermoplastic material such as polyurethane. It has been found that the present thermoplastic vulcanizate is particularly useful in the manufacture of high performance hoses. In a preferred aspect of the invention, the thermoplastic vulcanizate is used as the matrix for the construction of power steering hoses in automobiles.

The chlorine-containing component useful in the present invention is a chlorinated polyolefin or a chlorosulfonated polyolefin and includes, but is not limited to, chlorinated polyethylene, chlorinated polypropylene, chlorosulfonated polyethylene, chlorosulfonated polypropylene, chlorinated copolymers of ethylene and propylene, chlorosulfonated copolymers of ethylene and propylene and mixtures thereof.

The chlorine-containing polyolefin component of the thermoplastic vulcanizate is, typically, chlorosulfonated polyethylene although other chlorosulfonated polyolefins such as chlorosulfonated polypropylene and chlorosulfanated copolymers of ethylene and propylene may be used. For the purpose of this invention, the term copolymer is intended to include two or more monomers such as ethylene, propylene, butenes, etc. Hypalon, a chlorosulfonated polyethylene available from DuPont has been found to be particularly useful in the present invention.

The amount of chlorinated polyolefin and/or chlorosulfonated polyolefin in the thermoplastic vulcanizate is typically in the range of about 10 to 90% by weight of the thermoplastic vulcanizate, and preferably, about 30 to 70% by weight of the thermoplastic vulcanizate. While each of the chlorinated polyolefin and the chlorosulfonated polyolefin can be used with the exclusion of the other in the present invention, it has been found that a combination of the chlorinated polyolefin and the chlorosulfonated polyolefin provides excellent results as well. When both chlorinated polyolefin and chlorosulfonated polyolefin are present in the thermoplastic vulcanizate, the ratio of chlorinated polyethylene to chlorosulfonated polyethylene typically will be about 3:1 to 1:3, preferably about 2:1 to 1:2 and most preferably about 1:1. As indicated earlier Hypalon, a chlorosulfonated polyethylene manufactured by DuPont, has been found to be particularly useful as the chlorosulfonated component.

The high performance engineering thermoplastic component of the thermoplastic vulcanizate can be any of the high performance engineering thermoplastic materials commonly used in the industry. Examples of such high performance engineering plastic materials include polyurethanes; and may include polyethers such as polyacetal, polyphenylene oxide, polyether ketone, polyphenylene sulfide, etc.; polyamides such as nylon, e.g., nylon 6, nylon 66, nylon 4, nylon 11, nylon 12, nylon 6/12, nylon 6/10, etc.; highly aromatic polyamides such as Kevlar and Nomex which are available from DuPont; polyesters, such as polyethylene terephthalate; copolyesters such as Hytrel available from DuPont; polyimides, such as polyether imides, polyimide imides, polybismaleimides; polysulfones and the like. These resins may be used alone or as a blend of two or more of the resins. Preferably, the thermoplastic component is polyurethane. The amount of the high performance engineering thermoplastic component present in the thermoplastic vulcanizate will be that which is sufficient to provide the improved characteristics of the vulcanizate. The amount of the high performance engineering thermoplastic component can be in the range of about 90 to 10% by weight based on the weight of the thermoplastic vulcanizate and, preferably, about 70 to 30% by weight based on the weight of the thermoplastic vulcanizate.

Optionally, the high performance engineering thermoplastic material may be crosslinked in the thermoplastic vulcanizate matrix by adding a suitable crosslinking agent to the vulcanizate prior to or during extrusion of the high performance hose. The thermoplastic vulcanizate of the present invention may be crosslinked with conventional crosslinking systems such as peroxides, e.g., dicumyl peroxide, 2,5-dimethyl-2,5-di(t-butylperoxy)hexane, 2,5-dimethyl-2,5-di(t-butylperoxy) hexyne-3, 1,1-bis(t-butylperoxyne)-3, t-butylperoxybenzoate, and the like. It is believed that the thermoplastic vulcanizate of the present invention may also be crosslinked with polyols such as aromatic and cyclic polyols, e.g., hexafluoroisopropylidene-bis-(4-hydroxyphenyl) hydroquinone, isopropylidene-bis-(4-hydroxyphenyl), etc.; polyamines such as hexamethylenediamine carbamate, alicyclic diamine carbamate, dicinnamilidene hexamethylenediamine, and the like; cyanurates such as triallyl cyanurate (TAC); isocyanurates such as triallyl isocyanurate (TAIC); and the like; isocyanates and diisocyanates, such as diphenylmethane diisocyanate. Crosslinking agents containing at least two and preferably more than two functional groups such as TAC, TAIC, isocyanates, mixtures of isocyanates and polymeric isocyanates having functionality of more than 2.0 are found to be very useful. In some cases a conventional crosslinking accelerator may be used to provide improved results. Typically, the crosslinking agent will be added to the vulcanizate in an amount of about 1 to 10% and preferably about 1 to 5% by weight, based upon the weight of the vulcanizate.

The thermoplastic vulcanizate of the invention is particularly useful in the manufacture of high performance hoses such as power steering hoses and, in addition to being able to withstand the adverse effects of high temperature and chemical degradation, the present materials do not require vulcanization on a mandrel as is commonly required in the prior art; they can be extruded to close tolerance; they are light weight and recyclable, and they have better abrasion and tear resistance than prior art materials.

Other additives such as carbon black; silica; calcium carbonate; clay; diatomaceous earth, mica; heat stabilizers, e.g., metal oxides such as magnesium oxide, organotin compounds, and mixed metal salts; antioxidants; lubricants; plasticizers, softeners, processing aids; and the like may be incorporated into the thermoplastic vulcanizate in amounts generally known in the art to provide the desired effect for which they are added.

According to the invention, the high performance hose can be formed to close tolerance by a simple extrusion process wherein the thermoplastic vulcanizate is prepared by dynamic vulcanization where the elastomeric component is vulcanized during mixing.

The following examples are submitted for the purpose of further illustrating the present invention and are not intended as a limitation on the scope thereof.

EXAMPLE

Thermoplastic vulcanizates (TPV) are made with polyurethane and chlorosulfonated polyethylene or a mixture of chlorosulfonated polyethylene and chlorinated polyethylene by dynamic vulcanization method wherein the vulcanizate contains about 30 to 70% polyurethane and about 70 to 30% chlorosulfonated polyethylene or a mixture of chlorosulfonated polyethylene and chlorinated polyethylene wherein the ratio of chlorosulfonated polyethylene to chlorinated polyethylene is about 3:1 to 1:3. The compounds are extruded to a tight tolerance tube, braided with or without adhesive to get proper adhesion and then covered with the same or different composition TPV using the same base materials. The hoses are then cut into desired length, formed internally or externally by heating the fixture in a continuous line passing through an oven, and cooling the fixture by a suitable method, preferably by dipping or spraying using cold water.

Although the invention has been described and exemplified herein with respect to the preferred embodiments thereof, it is to be understood that the invention is not limited to the embodiments, and that variations can be made therein without departing from the scope of the invention.

What is claimed is:

1. A thermoplastic vulcanizate matrix which resists chemical attack and withstands temperatures up to about 300° F. for prolonged periods of time, said thermoplastic vulcanizate matrix comprising:
    a thermoplastic polymer in an amount of about 30 to 70 weight % of said thermoplastic vulcanizate matrix, wherein said thermoplastic polymer is selected from the group consisting of polyurethane, polyether, polyimide, polysulfone and mixtures thereof;
    a vulcanized chlorine-containing polyolefin elastomer in an amount of about 70 to 30 weight % of said thermoplastic vulcanizate matrix, wherein said chlorine-containing polyolefin elastomer is a mixture of two or more members selected from the group consisting of A, B, C, D, E, and F, wherein
    A is chlorinated polyethylene,
    B is chlorinated polypropylene,
    C is chlorinated copolymers of ethylene and propylene,
    D is chlorosulfonated polyethylene,
    E is chlorosulfonated polypropylene, and
    F is chlorosulfonated copolymers of ethylene and propylene, with the proviso that mixtures of A&B; A&C; A&D; B&C; B&D; C&D; A, B&C; A, B&D; A, C&D; and A, B, C&D are excluded; and
    a crosslinking agent selected from the group consisting of peroxide, a polyamine containing two or more functional groups, a polyols containing two or more functional groups, and mixtures thereof, wherein, said crosslinking agent is present in said thermoplastic vulcanizate matrix in an amount of about 0 to 5% by weight of said thermoplastic vulcanizate matrix,
    said chlorine-containing polyolefin elastomer having been vulcanized in said thermoplastic vulcanizate matrix by dynamic vulcanization.

2. The thermoplastic vulcanizate matrix of claim 1 wherein said thermoplastic material is polyurethane.

3. The thermoplastic vulcanizate matrix of claim 1, further including a cyanurate, an isocyanurate or a mixture thereof.

4. The thermoplastic vulcanizate matrix of claim 1, wherein said crosslinking agent is a polyamine containing two or more functional groups.

5. The thermoplastic vulcanizate matrix of claim 4, wherein said crosslinking agent is a diamine.

6. The thermoplastic vulcanizate matrix of claim 1, wherein said crosslinking agent is present in an amount up to about 5% by weight of said thermoplastic vulcanizate matrix, and said thermoplastic vulcanizate matrix is crosslinked in the presence of said crosslinking agent.

7. The thermoplastic vulcanizate matrix of claim 1, wherein said chlorine-containing polyolefin is a mixture of chlorosulfonated polyethylene and a chlorosulfonated copolymer containing ethylene and propylene.

8. A thermoplastic vulcanizate matrix which resists chemical attack and withstands temperatures up to about 300° F. for prolonged periods of time, said thermoplastic vulcanizate matrix comprising:
    a thermoplastic polyurethane in an amount of about 30 to 70% by weight of said thermoplastic vulcanizate matrix;
    a vulcanized chlorine-containing polyolefin elastomer comprising a mixture of two or more members selected from the group consisting of A, B, C, D, E, and F, wherein
    A is chlorinated polyethylene,
    B is chlorinated polypropylene,
    C is chlorinated copolymers of ethylene and propylene,
    D chlorosulfonated polyethylene,
    E is chlorosulfonated polypropylene, and
    F is chlorosulfanated copolymers of ethylene and propylene, with the proviso that mixtures of A&B; A&C; A&D; B&C; B&D; C&D; A, B&C; A, B&D; A, C&D; and A, B, C&D are excluded; and
    a polyamine crosslinking agent in an amount of 0 to about 5% by weight of said thermoplastic vulcanizate matrix,
    said chlorine-containing polyolefin elastomer having been vulcanized in said thermoplastic vulcanizate matrix by dynamic vulcanization.

9. The thermoplastic vulcanizate matrix of claim 8, further comprising a cyanurate, an isocyanurate or a mixture thereof.

10. The thermoplastic vulcanizate matrix of claim 8, wherein said crosslinking agent is a polyamine containing two or more functional groups.

11. The thermoplastic vulcanizate matrix of claim 10, wherein said crosslinking agent is a diamine.

12. The thermoplastic vulcanizate matrix of claim 8, wherein said crosslinking agent is present in an amount up to about 5% by weight of said thermoplastic vulcanizate matrix, and said thermoplastic vulcanizate matrix is crosslinked in the presence of said crosslinking agent.

13. The thermoplastic vulcanizate matrix of claim 8, wherein said chlorine-containing polyolefin is a mixture of chlorosulfonated polyethylene and a chlorosulfonated copolymer containing ethylene and propylene.

14. A thermoplastic vulcanizate matrix which resists chemical attack and withstands temperatures up to about 300° F., said thermoplastic vulcanizate matrix comprising:
    a thermoplastic polymer selected from the group consisting of polyurethane, polyether, polyimide, polysulfone and mixtures thereof, wherein said thermoplastic polymer is present in said vulcanizate in an amount of about 10 to 90% by weight of said thermoplastic vulcanizate matrix;
    a vulcanized mixture of a chlorosulfonated polyethylene and a chlorosulfonated copolymer containing ethylene and propylene, wherein said vulcanized mixture is present in said vulcanizate in an amount of about 10 to 90% by weight of said thermoplastic vulcanizate matrix; and
    a crosslinking agent selected from the group consisting of peroxide, a polyamine containing two or more functional groups, a polyols containing two or more functional groups, and mixtures thereof, wherein, said crosslinking agent is present in said vulcanizate in an amount of about 0 to 5% by weight of said vulcanizate,
    said mixture of chlorosulfonated polyethylene and chlorosulfonated copolymer containing ethylene and propylene having been vulcanized in said thermoplastic vulcanizate matrix by dynamic vulcanization.

* * * * *